US010987677B2

(12) United States Patent
Caires-Fernandez et al.

(10) Patent No.: US 10,987,677 B2
(45) Date of Patent: Apr. 27, 2021

(54) FLOTATION PERFORMANCE ENHANCEMENT

(71) Applicant: SCHLUMBERGER TECHNOLOGY CORPORATION, Sugar Land, TX (US)

(72) Inventors: Luis Eduardo Caires-Fernandez, Cypress, TX (US); Daniel E. Shannon, Houston, TX (US)

(73) Assignee: Cameron International Corporation, Houston, TX (US)

( * ) Notice: Subject to any disclaimer, the term of this patent is extended or adjusted under 35 U.S.C. 154(b) by 28 days.

(21) Appl. No.: 16/230,464

(22) Filed: Dec. 21, 2018

(65) Prior Publication Data

US 2020/0197954 A1   Jun. 25, 2020

(51) Int. Cl.
*B03D 1/00* (2006.01)
*B03D 1/14* (2006.01)
*B03D 1/006* (2006.01)

(52) U.S. Cl.
CPC .......... *B03D 1/1481* (2013.01); *B03D 1/006* (2013.01); *B03D 1/1412* (2013.01); *B03D 1/1443* (2013.01); *B03D 2203/006* (2013.01)

(58) Field of Classification Search
CPC .... B03D 1/006; B03D 1/1481; B03D 1/1412; B03D 1/1443
See application file for complete search history.

(56) References Cited

U.S. PATENT DOCUMENTS

| 3,784,468 A | * | 1/1974 | Garcia | B01D 17/0205 210/703 |
| 4,101,409 A | * | 7/1978 | Austin | B03D 1/1431 204/277 |
| 8,431,027 B2 | * | 4/2013 | Hayes | C02F 1/24 210/221.2 |
| 2014/0158631 A1 | | 6/2014 | Govind et al. | |

FOREIGN PATENT DOCUMENTS

| EP | 0134286 A2 | 3/1985 |
| JP | 2004136174 A | 5/2004 |
| KR | 200242426 Y1 | 10/2001 |
| WO | 2004007908 A1 | 1/2004 |

OTHER PUBLICATIONS

International Search Report and Written Opinion issued in the PCT Application PCT/US2019/066250, dated Apr. 14, 2020 (13 pages).

\* cited by examiner

*Primary Examiner* — Sharon Pregler
(74) *Attorney, Agent, or Firm* — Hauptman Ham, LLP; Ronald G. Embry, Jr.

(57) ABSTRACT

Flotation separation apparatus and methods are described herein, comprising a vessel having a plurality of flow guides oriented vertically in the vessel, a liquid inlet at a lower part of the vessel, a gas inlet at the lower part of the vessel, a first liquid outlet at an upper part of the vessel, a second liquid outlet at the lower part of the vessel, and a gas outlet at the upper part of the vessel.

11 Claims, 8 Drawing Sheets

FLOTATION PERFORMANCE ENHANCEMENT

FIELD

Embodiments of the present invention generally relate to separation of separable liquids. Specifically, methods and apparatus for enhanced flotation separation of separable liquids are described.

BACKGROUND

Oil/water separation is common in the hydrocarbon industry. In hydrocarbon recovery operations, water is commonly used to carry solids and liquids into and out of equipment and reservoirs for various purposes. The water frequently comes into contact with hydrocarbons such as oil, and can become intermingled with the hydrocarbon. When the operation is finished, water with hydrocarbon cannot be discharged to the environment without first removing the hydrocarbon.

Separations are typically performed to remove the hydrocarbon from the water. As is commonly known, oil typically separates from water spontaneously. Properties of the oil and the water influence how quickly and completely the separation occurs. For example, in most cases oil will form an emulsion in water that can take some time to separate. The time required for oil droplets dispersed in water to diffuse and coalesce together depends on chemical and physical properties of the oil and water, droplet size of the oil in the water, and relative amounts of oil and water in the emulsion. Without the aid of any separation technology, oil droplets and/or solid particles 10 microns in size normally require 30 minutes or more to separate adequately from water.

Many technologies are therefore used to efficiently separate separable liquids, as well as separating solids from liquids. Flotation is one commonly used technology. The liquid mixture to be separated is charged to a vessel and gas is injected into the liquid mixture as bubbles. Typically, when flotation is used, the liquid mixture has a continuous phase and a dispersed phase, with the dispersed phase being less dense than the continuous phase. The gas bubbles travel upward through the liquid mixture and enhance the speed with which the dispersed phase of the liquid mixture moves upward and coalesces. Such systems suffer from inefficient use of contacting space, and most flotation systems have significant "dead zones" that do not contribute to the separation process.

Other technologies used to speed separation of separable liquids include cyclonic devices such as hydrocyclones and chemical separators that use chemical additives to speed separation of the phases. Such technologies also suffer from their own inefficiencies of equipment size and weight and cost of chemical additives. There is a continuing need to reduce the size, weight, and cost of liquids separation equipment while maintaining or improving the speed of separation.

SUMMARY

Embodiments described herein provide a separator, comprising a vessel having; a plurality of plates oriented vertically in the vessel; a fluid inlet at a lower part of the vessel; a gas inlet at the lower part of the vessel; a first fluid outlet at an upper part of the vessel; a second fluid outlet at the lower part of the vessel; and a gas outlet at the upper part of the vessel.

Other embodiments described herein provide a method of separating liquid phases of a separable liquids mixture, the method comprising flowing a separable liquids mixture between vertically oriented plates in a vessel; bubbling a gas through the separable liquids mixture between the vertically oriented plates; removing a first separated liquid phase and a second separated liquid phase from the vessel; and removing the gas from the vessel.

Other embodiments described herein provide a method of separating liquid phases of a separable liquids mixture, the method comprising flowing a separable liquids mixture between vertically oriented corrugated plates in a vessel; bubbling a gas through the separable liquids mixture between the vertically oriented corrugated plates; providing a quiescent zone above the vertically oriented corrugated plates; removing a first separated liquid phase from the quiescent zone; removing a second separated liquid phase from the vessel; and removing the gas from the vessel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
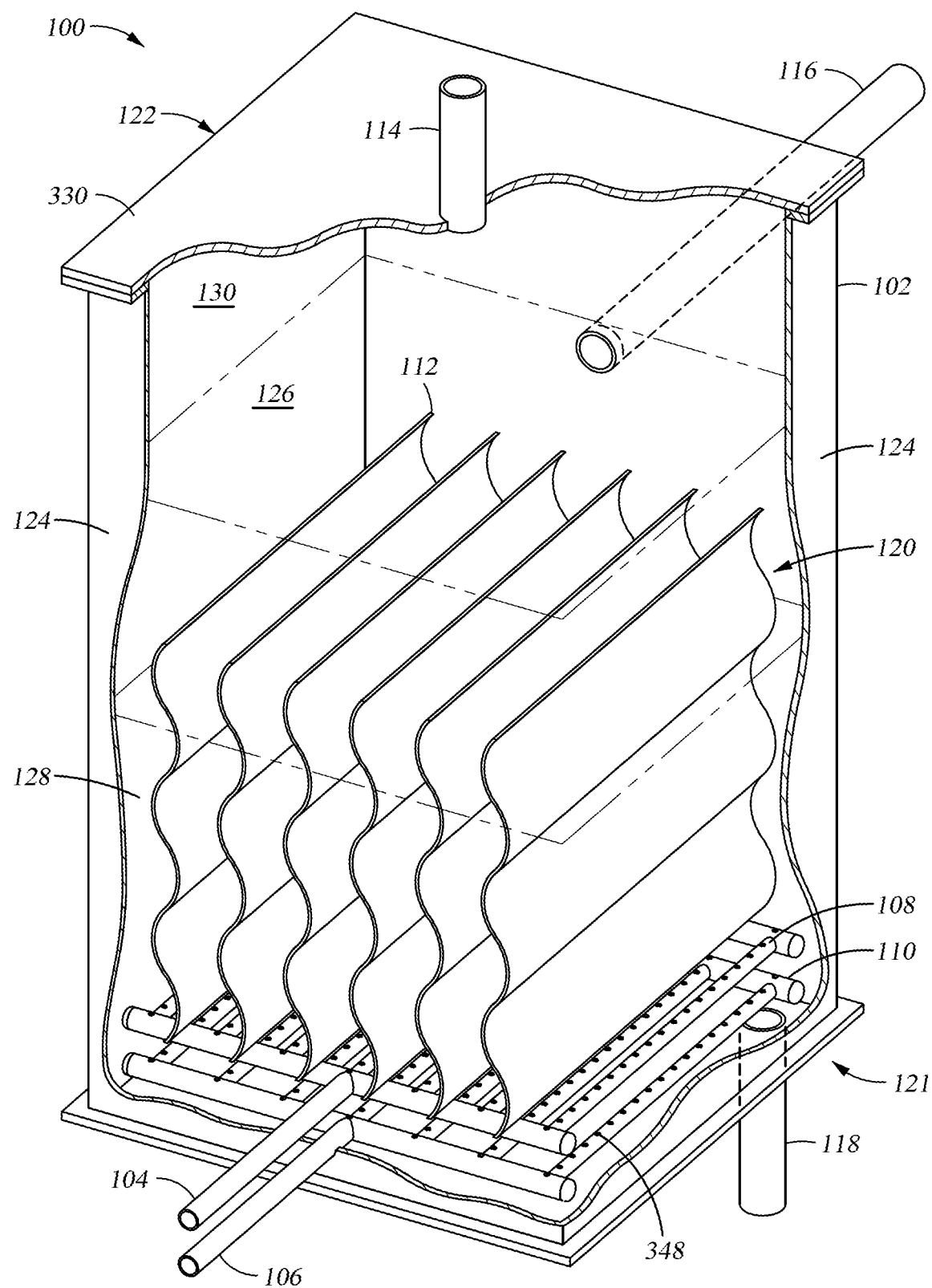
FIG. 1 is an isometric view of a separator according to one embodiment.

FIG. 1 is an isometric view of a separator 100 according to one embodiment. The separator 100 includes a vessel 102, a plurality of vertically oriented flow guides 112 disposed in the vessel 102, a fluid inlet 104 at a lower part 121 of the vessel 102, a gas inlet 106 at the lower part 121 of the vessel 102, a first fluid outlet 116 at an upper part 122 of the vessel 102, a gas outlet 114 at the upper part 122 of the vessel 102, and a second fluid outlet 118 at the lower part 121 of the vessel 102. Fluidly coupled to the fluid inlet 104 is a plurality of fluid distributors 108, each extending along the lower part 121 of the vessel 102 between, and potentially slightly below, two adjacent flow guides 112. The gas inlet 106 is generally below the fluid inlet 104 in this case, and fluidly coupled to the gas inlet 106 is a plurality of gas distributors 110, for example spargers, each extending along the lower part 121 of the vessel 102 below a corresponding fluid distributor 108.

The vertically-oriented flow guides 112 extend upward through the vessel 102 toward the upper part 122 of the vessel 102. The vertically-oriented flow guides 112 in this instance are corrugated plates that are substantially parallel, one to the other, and are attached to the walls 124 of the vessel 102 (see FIG. 3). In other embodiments, the flow guides 112 can be unattached to one or both of the walls 124 of the vessel 102, and can have other shapes as discussed further below. A plate-and-frame heat exchanger structure is one example of a type of structure like FIG. 1 that can be used to perform flotation enhanced separation.

The corrugations of the vertically-oriented flow guides 112 shown here are horizontal. That is, the corrugations are generally oriented parallel to the fluid distributors 108 and the gas distributors 110. In other words, a peak of one corrugation, and in this case all the corrugations, is disposed generally parallel to the fluid distributors 108 and the gas distributors 110. The vertically-oriented flow guides 112 can also be oriented such that the corrugations are generally oriented in a direction transverse to the fluid distributors 108 and the gas distributors 110, for example if the vertically-oriented flow guides 112 shown in FIG. 1 are rotated 90° about a longitudinal axis of the separator 100. The corrugations, oriented in either of these ways, provide some passive agitation to low density materials flowing upward between the vertically-oriented flow guides 112, which prevents channeling of low density materials along straight surfaces.

A quiescent zone 120 is provided above the vertically-oriented flow guides 112. The quiescent zone 120 is an area inside the vessel 102 where a first liquid phase 126 has risen to the top of the vessel 102 and separated from a second liquid phase 128 and a gas phase 130. The second liquid phase 128 may include entrained solids. The gas collects at the very top of the vessel 102 and is exhausted through the gas outlet 114. The first liquid phase is removed from the vessel 102 near the upper part 122 thereof through the first fluid outlet 116. The second liquid phase 128 is a mixture of separable liquids and gas, which may also contain solids. The discrete liquid phase of the mixture rises from the lower part 121, leaving a separated second liquid phase 128 at the bottom of the vessel 102. The second liquid phase is removed through the second fluid outlet 118.

Figure 2:
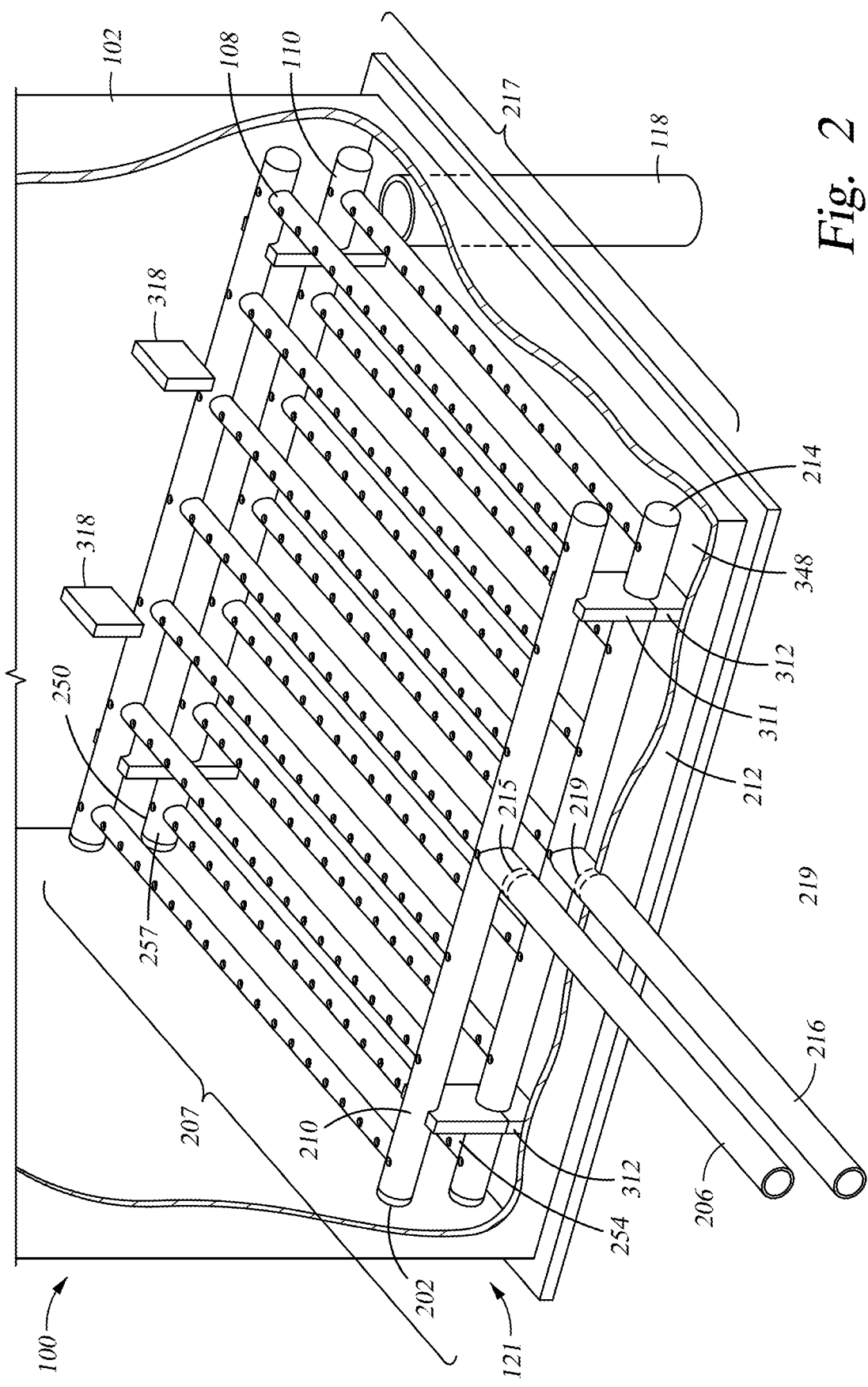
FIG. 2 is an isometric view of part of the separator of FIG. 1.

FIG. 2 is an isometric view of a portion of the separator 100 of FIG. 1. In FIG. 2, the flow guides 112 are removed to display the liquid and gas distributors 108 and 110. The fluid distributors 108 are located at a first elevation 202 within the vessel 102. The gas distributors 110 are located at a second elevation 204 within the vessel 102. The second elevation 204 is different from the first elevation 202 in this case, but in alternate embodiments the first elevation 202 may be the same as the second elevation 204. Here, the first elevation 202 is above the second elevation 204.

The fluid distributors 108 and the gas distributors 110 are shown here as linear tubes all extending parallel to a side, the same side, of the vessel 102, which in this case is shown as a rectangular box. Here, the fluid inlet 104 is a single fluid feed line 206 that enters through a fluid feed hole 215 (see FIG. 3) in a wall 124 of the vessel 102. The fluid feed line 206 couples to a fluid branch line 210, which extends laterally and is coupled to each of the fluid distributors 108. The fluid feed line 206, fluid branch line 210, and fluid distributors 108 define a fluid feed assembly 207 of the separator 100. Here, there are seven fluid distributors 108 distributed with even spacing between two opposite sides of the vessel 102, but any number of fluid distributors 108 may be used.

The fluid distributors 108, fluid branch line 210, and fluid feed line 206 are shown here with the same elevation and extending along the same plane, but variations may be used. For example, the fluid feed line 206 may form an angle with the plane defined by the wall 124 of the vessel 102. The fluid feed line 206 may also enter the vessel 102 through a floor 212 of the vessel. Here, the fluid distributors 108 and the fluid branch line 210 are shown extending along the same plane substantially parallel to the floor 212. In alternate embodiments, the fluid distributors 108 may extend along a plane perpendicular to a longitudinal axis of the fluid branch line 210. For example, the fluid distributors 108 may extend from the fluid branch line 210 toward the floor 212 of the vessel 102, and then bend or corner and extend straight across the vessel 102 parallel to the floor 212 of the vessel 102. Here, the fluid distributors 108 would also extend to one side of the gas distributors 110, or the coupling points of the fluid distributors 108 to the fluid branch line 210 can be adjusted. In this way, a portion of each of the fluid distributors 108 could be brought to the same plane as the gas distributors 110.

The gas distributors 110 likewise extend from their own respective gas branch line 214 straight across the vessel 102 parallel to the vessel floor 212. Here the fluid distributors 108 and the gas distributors 110 are shown in vertical alignment, but they may be staggered, or otherwise unaligned. The fluid branch line 210 and the gas branch line 214 are also shown here parallel and vertically aligned. A single gas feed line 216 is coupled to the gas branch line 214, and enters through a gas feed hole 219 formed in the wall 124 of the vessel 102. In this case, the gas feed hole 219 is aligned vertically with the fluid feed hole 215 (FIG. 3) and is below the fluid feed hole 215 when the vessel is in operating position. The gas feed line 216, gas branch line 214, and gas distributors 110 define a gas feed system 217 of the separator 100. The fluid feed line 206 and gas feed line 216 can couple to the respective fluid branch line 210 and gas branch line 214 by a fluid coupling 221 and a gas coupling 223 to allow installation and removal of the internal portions of the fluid and gas feed systems 207 and 217.

As noted above, the fluid distributors 108 and the gas distributors 110 are shown here extending parallel to the vessel floor 212, each fluid distributor 108 parallel to every other fluid distributor 108, each gas distributor 110 parallel to every other gas distributor 110, each fluid distributor 108 parallel to every gas distributor 110, each fluid distributor 108 vertically aligned with one gas distributor 110, and each gas distributor 110 vertically aligned with one fluid distributor 108, the fluid distributors 108 located above the gas distributors 110 within the vessel 102. In alternate embodiments, any of these arrangement characteristics may be different. The fluid distributors 108 are provided to flow a separable liquid mixture comprising distinct liquid phases, and potentially solids, in a mixture into the vessel 102 at the lower part 121 thereof, and the gas distributors 110 are provided to flow a gas into the vessel 102. In alternate embodiments, multiple fluid feed lines 206 and/or multiple gas feed lines 216 may be used. If the number of fluid feed lines 206 equals the number of fluid distributors 108, the fluid branch line 210 may be eliminated. Likewise, if the number of gas feed lines 216 equals the number of gas distributors 110, the gas branch line 214 may be eliminated.

In other embodiments, the fluid feed line 206 and the gas feed line 216 may enter the vessel 102 through different walls 124. For example, the gas feed assembly 217 and the fluid feed assembly 207 may be oriented along mutually perpendicular directions such that the fluid feed hole 215 and the gas feed hole 219 are formed through different walls 124 of the vessel 102. In another embodiment, the fluid feed hole 215 and the gas feed hole 219 may be formed through opposite walls 124 of the vessel 102 such that the fluid feed line 206 and the gas feed line 216 are parallel. It this case, the fluid feed system 207 and the gas feed system 217 may be interleaved by extending the gas distributors 110 to the plane defined by the fluid distributors 108, or vice versa, and offsetting the gas distributors 110 relative to the fluid distributors 108, such that the gas distributors 110 extend between and beside the fluid distributors 108.

Figure 3:
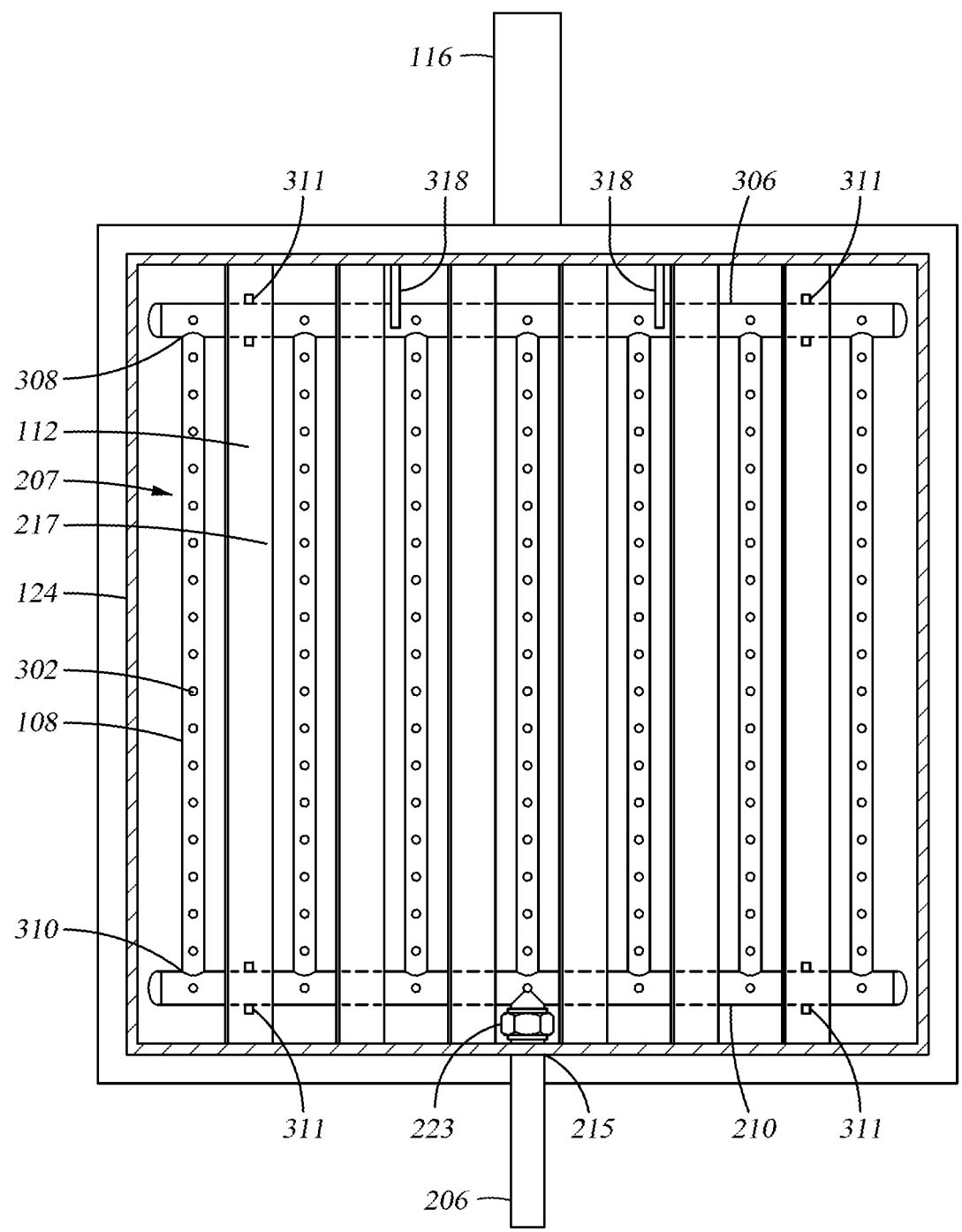
FIG. 3 is a cross-sectional view of the separator of FIG. 1.

FIG. 3 is a cross-sectional view of the separator 100 taken through a middle part of the separator 100. This view looks toward the lower part 121 of the separator 100 such that the fluid feed system 207 is visible. The gas feed system 217 is below the fluid feed system 207, and is not visible in FIG. 3. The flow guides 112, located above the fluid feed system 207, are shaped in a corrugated shape, with sections of each plate substantially perpendicular to other sections of the same plate.

The corrugations of the vertically-oriented flow guides 112 shown here are horizontal. That is, the corrugations are generally oriented parallel to the liquid distributors 108 and the gas distributors 110. In other words, a peak of one corrugation, and in this case all the corrugations, is disposed generally parallel to the liquid distributors 108 and the gas distributors 110. The vertically-oriented flow guides 112 can also be oriented such that the corrugations are generally oriented in a direction transverse to the liquid distributors 108 and the gas distributors 110, for example if the vertically-oriented flow guides 112 shown in FIG. 1 are rotated 90° about a longitudinal axis of the liquid separator 100. The corrugations, oriented in either of these ways, provide some passive agitation to low density materials flowing upward between the vertically-oriented flow guides 112, which prevents channeling of low density materials along straight surfaces.

The fluid distributors 108 have a plurality of holes 302 formed through a wall of the fluid distributors 108 to allow for fluid flow from the fluid distributors 108 into the interior of the vessel 102. Referring back to FIG. 2, the gas distributors 110 also have a plurality of holes 348 formed in the walls thereof that allow gas flow from the gas distributors 110 into the interior of the vessel 102. The holes 302 and 348 here are all at the apex of each fluid and gas distributor 108 and 110 such that liquid emerging from the fluid distributors 108 has an upward velocity and gas emerging from the gas distributors 110 also has an upward velocity. The holes 302 and 348 are uniformly distributed along the length of the liquid and gas distributors 108 and 110 such that liquid and gas emergence points into the vessel 102 are evenly distributed throughout the lower part 121 of the vessel 102.

In other embodiments, holes 302 and 348 in the fluid and gas distributors 108 and 110 may be located anywhere in the walls of the fluid and gas distributors 108 and 110. For example, the holes 302 and 348 may be located in the bottom, at the nadir, of the fluid and gas distributors 108 and 110, instead of or in addition to holes at the top. Holes in the bottom of the fluid distributors 108 may help avoid buildup of solids in the fluid distributors 108. Holes may also be located in the sides of the liquid and gas distributors 108 and 110.

In other embodiments, openings other than holes may be used in addition to, or instead of, holes in the fluid and gas distributors 108 and 110, with any geometric arrangement in the walls of the liquid and gas distributors 108 and 110. For example slots may be used according to any arrangement, for example longitudinal, azimuthal, helical, and the like. Slots may be covered with mesh, screen, or porous media in some cases. For example, slots in the walls of the gas distributors 110 may be covered by a porous or holey member to create bubbles as gas flows into the interior of the vessel 102.

As noted above the vessel 102 is partially defined by vessel walls 124, which are here flat plates all perpendicular to each other so the vessel walls 124 define a rectangular box. Other arrangements may also be used, including planar non-perpendicular arrangements, curved arrangements, and other convenient arrangements. The floor 212 of the vessel 102 may be removable to allow for easy removal of the fluid and gas feed systems 207 and 217. The fluid feed system 207 includes a fluid support line 306 that joins the fluid distributors 108 at a second end 308 of the fluid distributors 108 opposite from a first end 310 of the fluid distributors 108 where the fluid branch line 206 is coupled to the fluid distributors 108. The fluid support line 306 provides support at the second ends of the fluid distributors 108 to secure the fluid distributors 108 from movement.

A plurality of fluid system supports 311 support the fluid branch line 210 and the fluid support line 306. Referring back to FIG. 2, the fluid system supports 311 are visible. The fluid system supports 310 here rest on a plurality of gas system supports 312, which support the gas branch line 214 and a gas support line 250, which similar to the fluid support line 306 couples the gas distributors 110 at a second end 252 thereof opposite a first end 254 of the gas distributors 110 where the gas branch line 214 couples to the gas distributors 110. The gas system supports 312 extend from the floor 212, and support the gas feed system 217 and the fluid feed system 207 above.

In the case where the flow guides 112 are attached to the vessel walls 124, the gas and fluid feed systems 217 and 207 may be installed and removed by making the floor 212 removable. The floor 212 can be removed, and the gas and fluid feed systems 217 and 207 removed from the separator 100, along with the supports 310 and 312. To install the fluid and gas feed systems 207 and 217, the open vessel 102, with flow guides 112 attached to the walls 124, can be positioned with the lower part 121 facing upward. A pair of wall supports 318 are provided extending from the wall 124 opposite from the fluid feed hole 215 (and gas feed hole 219, not visible in FIG. 3) to aid installation of the fluid feed system 207 when the flow guides 112 are attached to the walls 124. The fluid feed line 206 is inserted through the hole 215 provided in the wall 124 for the fluid feed line 206, and the fluid support line 306 is rested on the supports 318. The fluid system supports 310 are installed in slots 326 formed by fins 328 extending from the fluid branch line 206 and the fluid support line 306. The gas feed line is inserted through the gas feed hole 219 (FIG. 2), and the gas feed system 217 is rested on the fluid system supports 310. The removable floor 212, with gas system supports 312 extending therefrom, is then installed with the gas system support 312 juxtaposed with the fluid system supports 310. The separator 100 can then be righted to operating position with the gas feed system 217, the fluid system supports 306, and the fluid feed system 207 all resting on the gas system supports 312.

In an embodiment where the flow guides 112 are not attached to the walls 124 of the vessel 102, the bottom installation configuration described above can be used, or a top installation configuration can be used. Referring again to FIG. 2, the vessel 102 has a top 330, and in such cases, the top 330 of the vessel 102 can be removable. If the flow guides 112 are not attached to the vessel walls 124, when the top 330 of the vessel 102 is removed, the flow guides 112 can be installed and removed, along with the fluid and gas feed systems 207 and 217, and supports. In the case of top installation, the fins 328 would not be provided on the fluid branch line 210, but fins may be provided on the gas branch line to allow convenient placement of the fluid system supports 310 during assembly. In the case the flow guides 112 are not attached to the vessel walls 124 and are removable from the vessel 102, the flow guides 112 may be connected by a band around the edge of the flow guides 112, or by one or more rods through all the flow guides 112, such that the flow guides 112 can be removed as a unit. Such connectors may also be useful, in such cases, to prevent the flow guides 112 from moving during operation of the separator 100.

Figure 4:
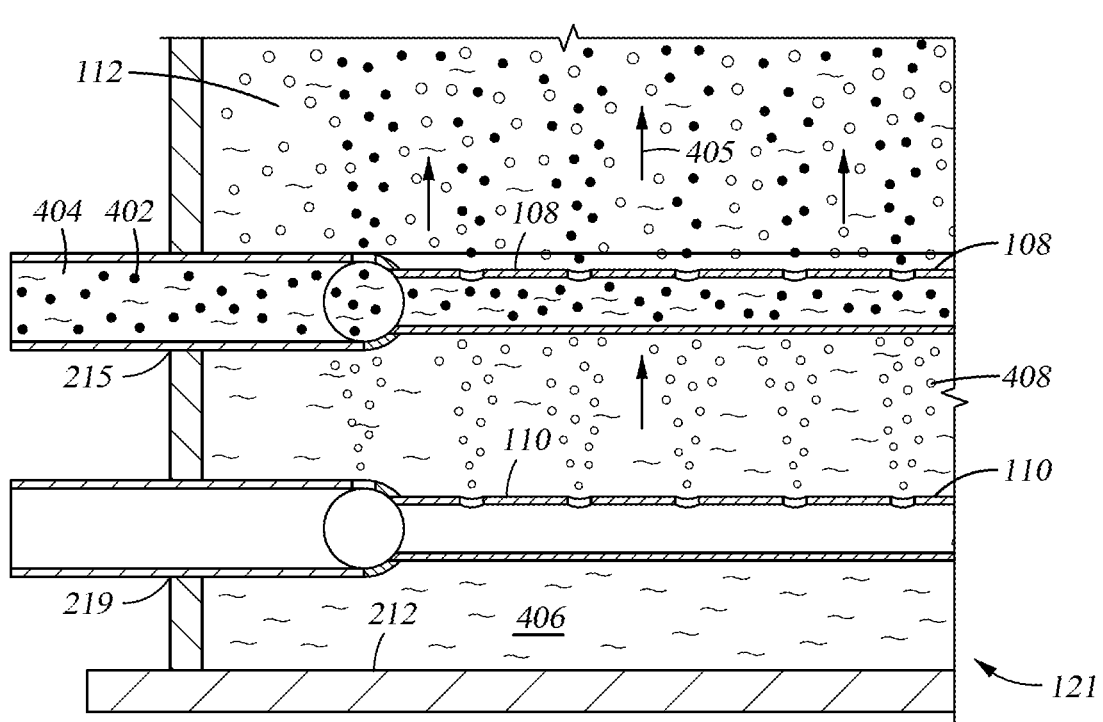
FIG. 4 is an interior view of a lower part of the separator of FIG. 1 in operation.

FIG. 4 is an internal view of a portion of the separator 100 during operation. This view looks through the lower part 121 of the vessel 102 between the flow guides 112. In this embodiment, at least some of the fluid distributors 108 and the gas distributors 110 are located between the flow guides 112. The fluid distributors 108 provide a separable liquid mixture having distinct liquid phases in domains of a first liquid 402 having a first density and a second liquid 404 having a second density. The separable liquid mixture may also contain some solids. Oil and water, and potentially solids, may be separated using the separator 100. The liquid having the lower density has the natural tendency to rise above the liquid with the higher density, so the domains of the first liquid 402 rise through the domains of the second liquid 404, as indicated by arrow 405. In many cases, the domains are small and the liquid mixture is an emulsion. The domains of the first liquid 402 thus flow upward through the liquid mixture while domains of the second liquid 404 flow downward, remain stationary, or flow upward more slowly than the domains of the first liquid 402. Solids generally move with the higher density liquids.

Through separation of the two liquid phases, the domains of the second liquid 404 coalesce into a continuous phase 406 of the second liquid 404 in the lower part 121 of the vessel 102. Gas is introduced in the lower part 121 of the vessel 102 in a distributed manner, as described above, such that gas bubbles 408 flow between the flow guides 112 and accelerate separation of the domains 402 from the domains 404, and therefore accelerate coalescence of the continuous domain 406 of the second liquid, along with a continuous domain of the first liquid, further discussed below. The continuous phase 406 of the second liquid 404 is removed, with at least a majority of any solids that may be present, from the vessel 102 through the second fluid outlet 118 (FIG. 1) formed in the lower part 121 of the vessel 102, for example through the floor 212. The second fluid outlet 118 is not visible in FIG. 4.

Movement of the gas and liquid in the vessel 102 is constrained in at least one dimension by the flow guides 112. In a direction perpendicular to the flow guides 112, gas bubbles 408 are prevented from collecting and coalescing near the center of the vessel 102, so the gas is more fully utilized in separating the liquid domains. Forcing the gas bubbles 408 to remain within channels defined by the flow guides 112 ensure the gas bubbles 408 are more effective in facilitating separation of the liquid phases 402 and 404. It should be noted that the separators described herein can also separate solids to the second fluid outlet 118, which in such cases carries liquid with entrained solids. So, a separable liquid mixture containing some solids can be provided to any of the separators described herein, and a low density liquid will separate from a high density liquid containing all, or a majority, of the solids. The low density liquid will exit through the first liquid outlet 114, while the high density liquid, with entrained solids, will exit through the second fluid outlet 118.

Figure 5:
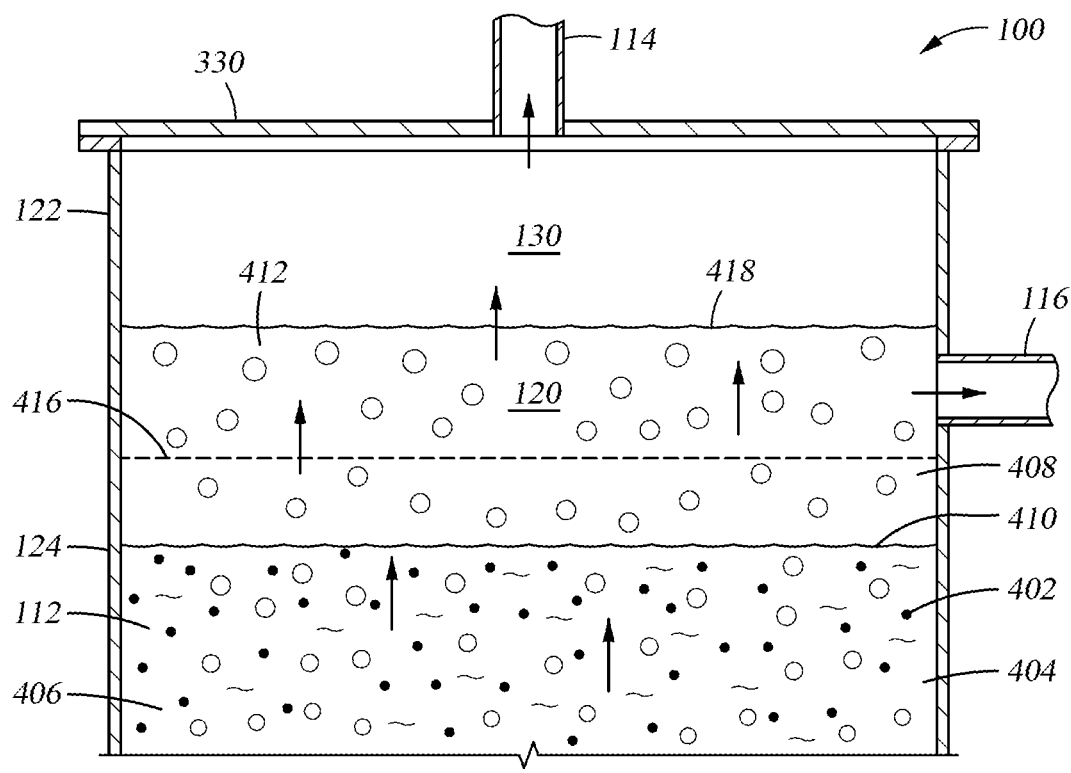
FIG. 5 is an interior view of an upper part of the separator of FIG. 1 in operation.

FIG. 5 is an internal view of another portion of the separator 100 during operation. In this view, the upper portion 122 of the separator 100 is visible. The top 330 is shown in place. This portion of the separator 100 is above the portion shown in FIG. 4 and is a continuation of the separation operation shown in one stage in FIG. 4. In FIG. 5, the domains of the first liquid 402 continue to move upward through the continuous domain 406 of the second liquid until an interface 410 is reached. The interface 410 forms a phase separation boundary between the first liquid 402 and the second liquid 404, with the first liquid 402 forming a continuous phase 412 above the interface 410 and the second liquid forming the continuous phase 406 below the interface 410. The domains of the first liquid 402 become concentrated below the interface 410 and coalesce together to form the interface 410. The gas bubbles 408 continue to rise through the interface 410 and the continuous phase 412 above the interface 410 to emerge into the gas phase 130. The gas phase 130 and the continuous phase 412 of the first liquid 402 form a gas-liquid interface 418. The gas-liquid interface 418 is above a top 416 of the plates 212.

The area between the top 416 of the plates 412 and the gas-liquid interface 418 is the quiescent zone 120. In the quiescent zone 120, any remaining microdomains of the second liquid 404 that may have been entrained by upflowing domains of the first liquid 402 and gas bubbles 408 are given time to settle to the interface 410 by gravity before the continuous phase 412 is decanted through the first fluid outlet 116. The gas phase 130 is evacuated through the gas outlet 114.

Figure 6:
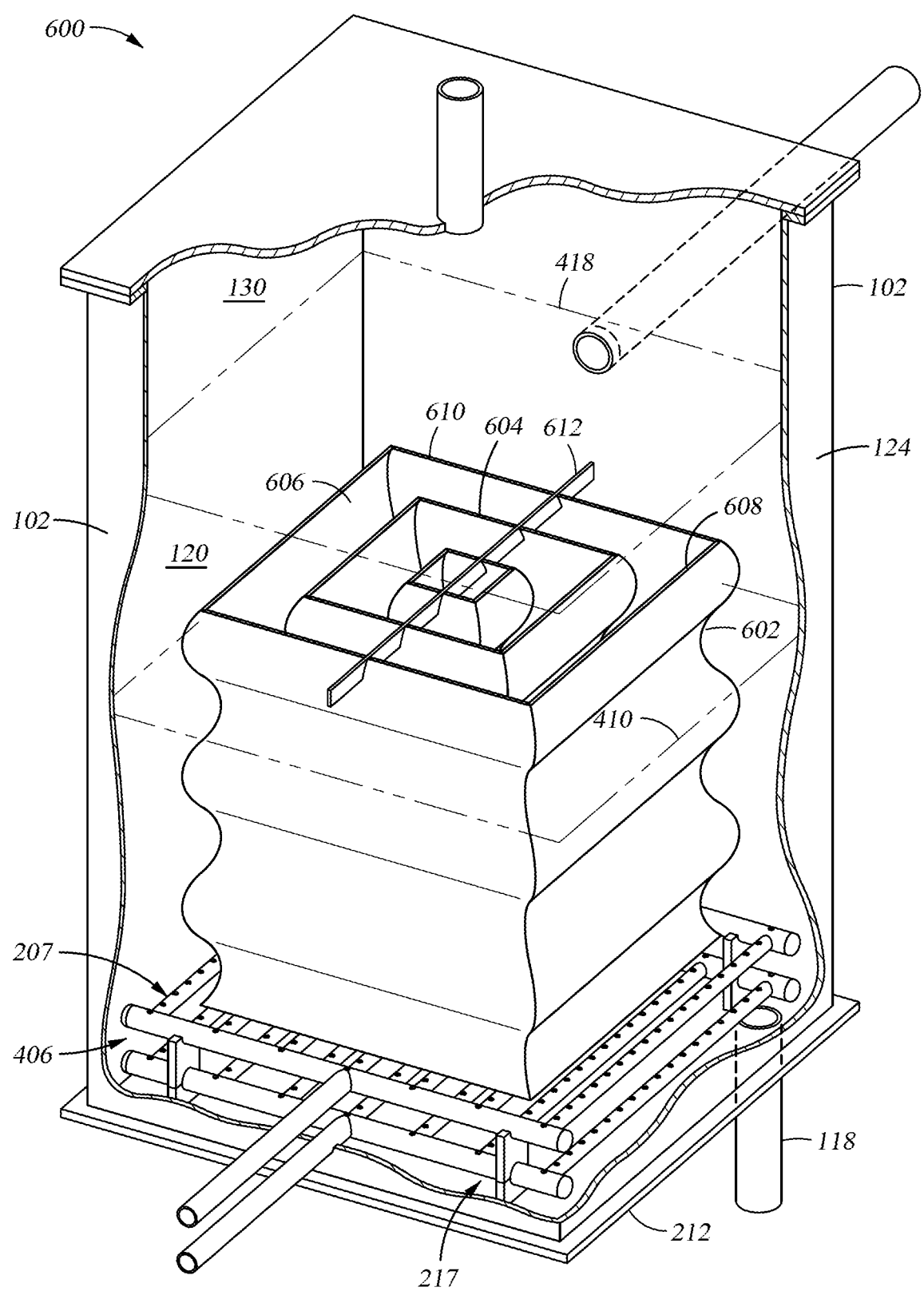
FIG. 6 is an isometric view of a separator according to another embodiment.

The separator 100 improves efficiency of separating liquid mixtures comprising separable liquid phases by maintaining distribution of upflowing gas bubbles throughout the liquid during the separation. Where conventional flotation separators allow gas bubbles to drift away from vessel walls and concentrate toward the center of the vessel, leaving large regions near the vessel walls unperturbed by rising gas, the flow guides 112 of the separator 100 maintain lateral dispersion of the upflowing gas bubbles to improve flotation utilization of gas. FIG. 6 is an isometric view of a separator 600 according to another embodiment. The separator 600 is similar in most respects to the separator 100, with the exception that the flow guides 112 of the separator 100 are replaced by a flow guide 602. Here, the flow guide 602 comprises a plurality of square cylinders 604. The square cylinders 604 are concentrically arranged to define four flow zones 606, including one flow zone between the outer square cylinder and the vessel walls 124. Each flow zone 606 has a first boundary 608 in a first direction parallel to the floor 212 and a second boundary 610 in a second direction parallel to the floor 212 and perpendicular to the first direction. The square cylinders 604 also feature corrugations that are substantially horizontal, that is oriented generally parallel to the floor 212 of the separator 600. Here, because the square cylinders 604 have perpendicular boundaries 608 and 610, the corrugations extend in perpendicular directions parallel to the floor 212. The perpendicular boundaries 608 and 610 constrain coalescence of gas bubbles in two directions to prevent migration of too much gas too far from the walls 124 of the vessel 102, and the corrugations provide passive agitation to upward flowing components. Here the flow guide 602 is not attached to any of the walls 124 and is shown resting on the fluid feed system 207. Grooves (not shown) may be provided in the members of the fluid feed system 207 to maintain the flow guide 602 is a secure position within the vessel 102 during operation. The square cylinders 604 may be connected by one or more spans 612, here shown spanning the tops of the square cylinders 604, to maintain the relative position of the square cylinders 604 during operation and to facilitate installation and removal of the flow guide 604.

Figure 7:
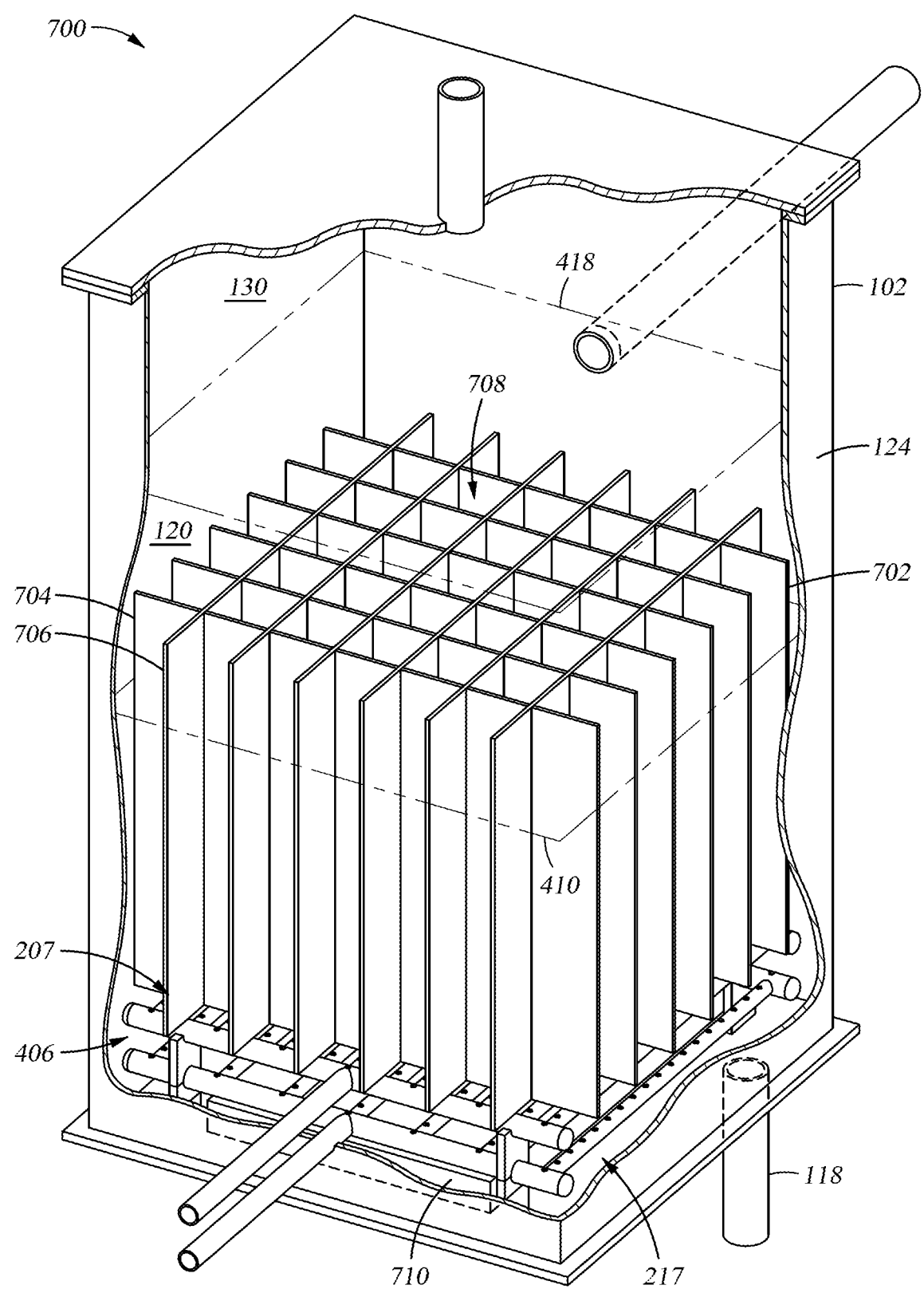
FIG. 7 is an isometric view of a separator according to another embodiment.

FIG. 7 is an isometric view of a separator 700 according to another embodiment. The separator 700 is similar to the separators 100 and 600 in many respects. The chief difference in the separator 700 is in the flow guide. The separator 700 has a flow guide 702, disposed in the vessel 102, which has a first plurality of parallel plates 704 and a second plurality of parallel plates 706. These plates do not feature corrugations, and such corrugations are indeed generally optional. Each plate of the first and second plurality of plates 704 and 706 is vertically oriented in the vessel 102. Each plate of the first plurality of plates 704 is perpendicular to every plate of the second plurality of plates 706. The plates here are flat, but the plates can be curved, wavy, corrugated, ridged, or other non-flat configurations, and the plates of the first plurality could be quasi-parallel. The plates of the second plurality could also be quasi-parallel. In general, the first plurality of plates 704 and the second plurality of plates 706 form a grid-like pattern that provides a plurality of vertical channels 708 to channel fluid flow through the interior of the vessel 102. As noted above, the plates constrain central gathering of gas bubbles in the vessel 102. In this case, central gathering is constrained in two dimensions.

The spacing of the plates is the same in the first and second plurality of plates 704 and 706 shown in FIG. 7, but the spacing may vary. For example, the first plurality of plates 704 may be spaced at a first spacing, the second plurality of plates 706 may be spaced at a second spacing, and the first and second spacings may be different. In other cases, the first plurality of plates 704 may have a first portion, for example an outer portion, with a first spacing and a second portion, for example an inner portion, with a second spacing different from the first spacing, for example larger than the first spacing. Likewise, the second plurality of plates 706 may have a first portion, for example an outer portion, with a first spacing and a second portion, for example an inner portion, with a second spacing different from the first spacing, for example larger than the first spacing. That is to say, the flow guide 702 may include an outer zone with a first plurality of vertical channels having a first dimension and an inner zone with a second plurality of vertical channels having a second dimension larger than the first dimension.

The separator 700 includes an optional UV source 710 located in the lower portion 121 of the vessel 102. Here, the UV source 710 is shown located on the floor 212 of the vessel 102 between the floor 212 and the gas feed system 217. The UV source provides ultraviolet radiation to treat the materials in the separator 700. For example, when the continuous phase 406 is water, treating the water with UV prior to discharge from the vessel 102 can reduce microbes and other potentially harmful components before the water is discharged to the environment. Such a UV source may be positioned at any convenient location in the vessel 102, and may be used with any separators of the types described herein, including the separators 100, 600, 700, and 800.

Figure 8:
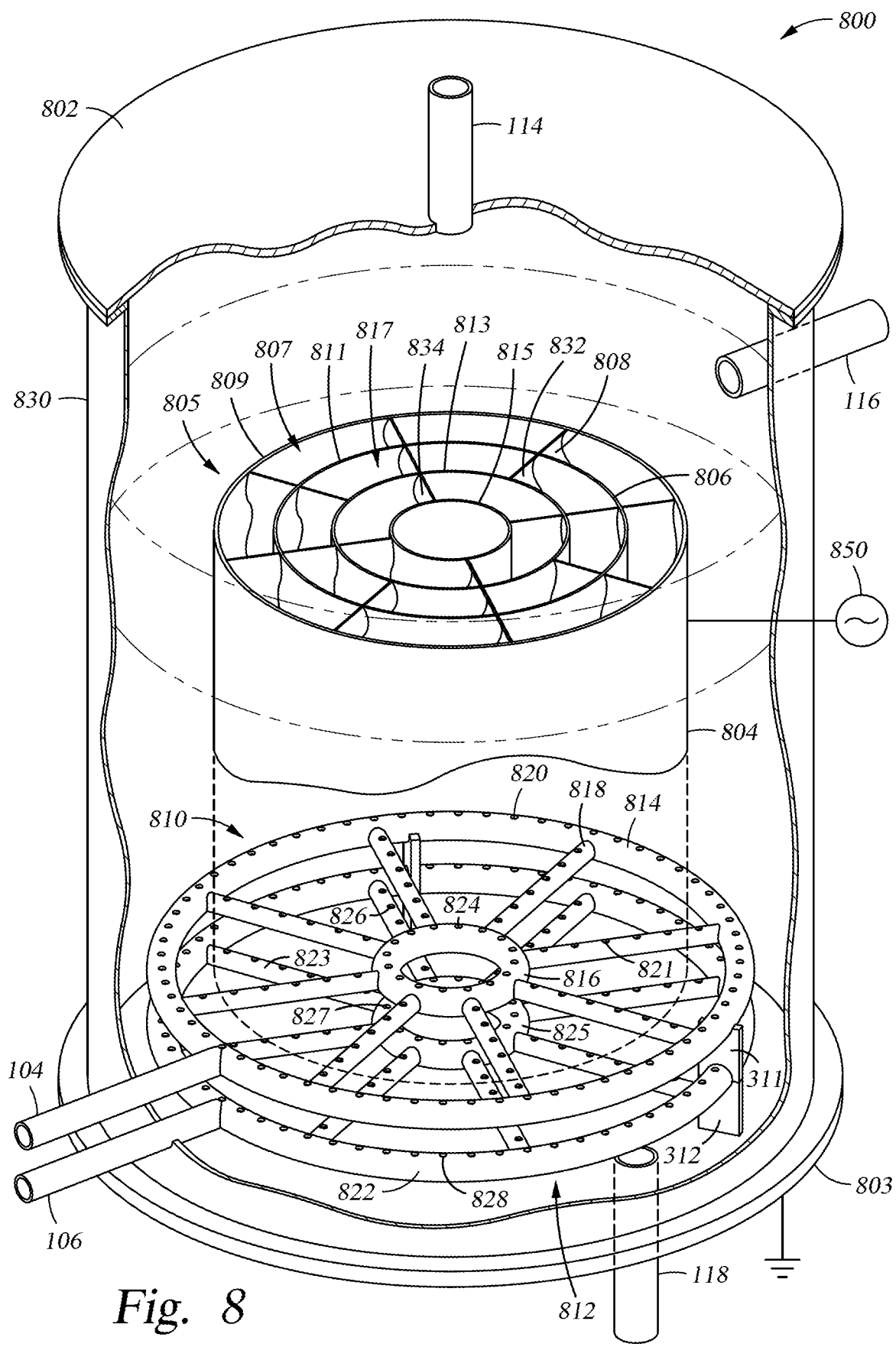
FIG. 8 is an isometric view of a separator according to yet another embodiment.

FIG. 8 is an isometric view of a separator 800 according to another embodiment. The separator 800 embodies the same general concepts as the separators 100, 600, and 700, with structural differences. The separator 800 includes a vessel 830, which is a right circular cylinder, enclosed by a circular top plate 802 and a circular bottom plate 803. The separator 800 includes a cylindrical flow guide 804 comprising a plurality of cylindrical conduits 805, which are coaxially positioned within the vessel 830. The conduits are uniformly spaced in this case from a central conduit 815 to an outer conduit 809. The wall of the vessel 830 also serves as a cylindrical conduit.

The conduits 805 are connected by a plurality of baffles 807 connected between adjacent conduits 805. Here, there are three sets of baffles 807 connecting three adjacent pairs of coaxially aligned conduits 805. A first plurality of baffles 808 connects the outer conduit 809 with a first intermediate conduit 811 coaxially aligned with the outer conduit 809. The first intermediate conduit 811 has a diameter that is less than a diameter of the outer conduit 809 A second plurality of baffles 832 connects the first intermediate conduit 811 with a second intermediate conduit 813 coaxially aligned with the first intermediate conduit 811. The second intermediate conduit 813 has a diameter less than the diameter of the first intermediate conduit 811. A third plurality of baffles 834 connects the second intermediate conduit 813 with the central conduit 815, which has a diameter less than the diameter of the second intermediate conduit 813. Here the number of baffles in the second and third plurality of baffles 832 and 834 is the same here, but the number may be different. The number of baffles in the first plurality of baffles 808 is greater than the number of baffles in the second plurality of baffles 832. The baffles are all generally uniformly spaced around the circumference of the conduits 805. The baffles also all have horizontally-oriented corrugations to provide passive agitation, as in other embodiments described herein.

The flow guide 804 provides a plurality of vertically oriented channels 817 similar to the vertical channels 708 of the separator 700, but shaped and oriented according to a cylindrical geometry. As with the channels 708, the channels 817 constrain central gathering of gas bubbles by providing barriers to radial movement of gas bubbles in the cylindrical flow guide 804. The baffles 807 prevent azimuthal gathering of gas bubbles to maintain distribution and utilization of gas bubbles throughout the vessel 830.

The separator 800 also includes a fluid feed system 810 and a gas feed system 812 that are shaped and arranged according to a cylindrical geometry. The fluid feed system includes an outer fluid distributor 814 that is circular in shape and coupled to the fluid inlet 104. A plurality of radial fluid distributors 818 connects the outer fluid distributor 814 with an inner fluid distributor 816 that is also circular in shape and arranged coaxially with the outer fluid distributor 814. The outer fluid distributor 814 includes a first plurality of holes 820. The radial fluid distributors 818 include a second plurality of holes 821. The inner fluid distributor 816 includes a third plurality of holes 824. The holes in the fluid distributors allow liquid, which may contain solids, to enter the vessel 830 from the fluid feed system 810.

The gas feed system likewise has an outer gas distributor 822 that is circular in shape and coupled to the gas inlet 106. A plurality of radial gas distributors 823 connects the outer gas distributor 822 to an inner gas distributor 825 that is also circular in shape and arranged coaxially with the outer gas distributor 822. The outer gas distributor 822 has a first plurality of holes 828. The radial gas distributors 823 have a second plurality of holes 826. The inner gas distributor 825 has a third plurality of holes 827. The holes in the gas distributors allow gas to enter the vessel 830 from the gas feed system 812.

Here the fluid and gas feed systems 810 and 812 are oriented in vertical alignment, with the outer distributors 814 and 822 vertically aligned, the radial distributors 818 and 823 vertically aligned, and the inner distributors 816 and 825 vertically aligned. Any or all of the distributors could also be vertically non-aligned. The gas system support 312 and the fluid system support 311 are also used here as in FIG. 2. The flow guide 804 rests on, and is supported by, the fluid feed system 810.

The liquids in the vessel 830 may be exposed to an electric field by coupling electric power to any convenient part of the separator 800. Here, electric power is shown coupled to the flow guide 804, and the vessel 830 is shown coupled to a reference potential. The electric field can be used to accelerate separation of the separable liquid phases of the fluid mixture, in the event the separable liquid phases have different electrical properties. The electric field is here shown as a time-varying electric field, but a static electric field can also be used. Such measures can be used with any of the separators 100, 600, 700, and 800, and may also be used with the UV source of the separator 700.

Figure 9:
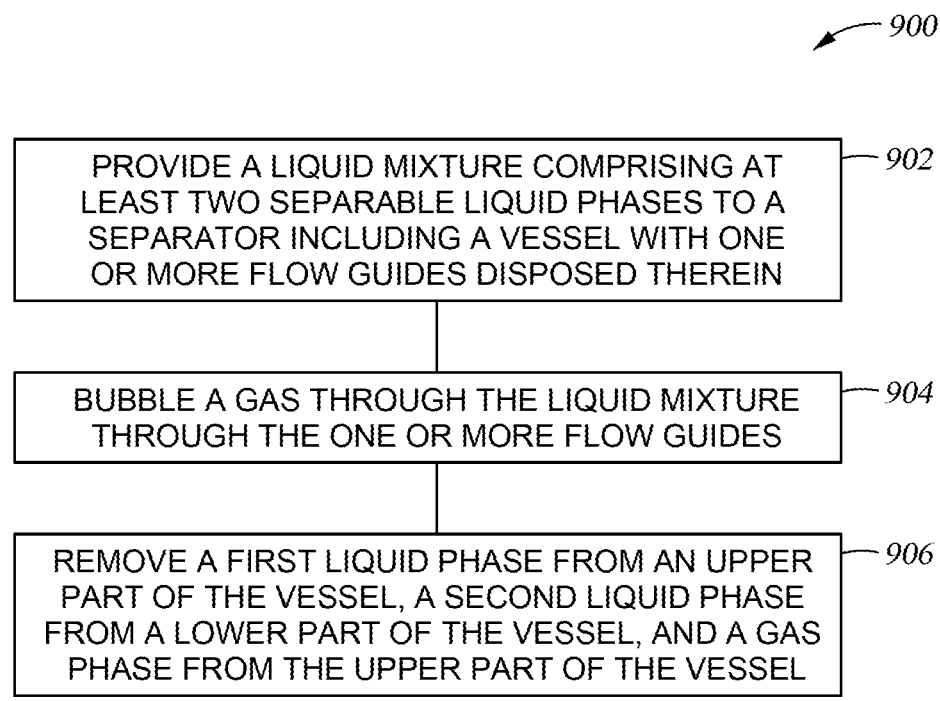
FIG. 9 is a flow diagram summarizing a method according to another embodiment.

The separators 100, 600, 700, and 800, and others similar to those, can be used to practice a separation method. FIG. 9 is a flow diagram summarizing a method 800 according to one embodiment. At 902 a mixture comprising at least two separable liquid phases, and optionally some solids, is provided to a separator. The separator includes a vessel with one or more flow guides oriented vertically therein. The flow guides generally define vertical flow zones to confine the phases flowing in the flow zone and prevent horizontal separation or coalescence. The flow guides may be parallel flat plates, non-parallel flat plates, parallel curved plates, non-parallel curved plates, parallel corrugated plates, non-parallel corrugated plates, parallel wavy plates, non-parallel wavy plates, parallel ridged plates, and non-parallel ridged plates. The flow guides may include plates that intersect. For example, the flow guides may include plates that form a grid-like pattern.

The separation distance of the flow guides, defining the lateral dimension of the flow guides across the flow direction, is typically small compared to a vertical length of the flow guides to provide constrained lateral freedom and unconstrained vertical flow freedom. Distance between the flow guides may be in the range of about 2 mm to about 5 cm in some cases. Dimensions of the flow guides are at least about 0.5 m in length and 0.1 m to 1.0 m in width in most cases.

The flow guides are disposed in a vessel having a fluid feed distribution system and a gas feed distribution system. The fluid and gas feed distribution systems are located and oriented to distribute liquid and gas, and any entrained solids, among the flow zones defined by the flow guide. The vessel may be any shape, such as cylindrical or rectangular, and the flow guide is generally shaped to follow the shape of the vessel. In a rectangular vessel, the flow guide may comprise a plurality of parallel plates, and vessel may have two substantially rectangular planar major walls that are substantially parallel to the orientation planes of the flow guides. In this case, one of the flow guides is nearest to each of the major walls, and a distance between a flow guide adjacent to a major wall and the adjacent major wall may be about 2 mm to about 10 cm. In other cases, the flow guides may be corrugated, and the corrugations may be parallel or non-parallel. Here, parallel corrugated flow guides mean flow guides may be made of planar segments that intersect at angles, and every planar segment of a flow guide is parallel to the adjacent corresponding planar segment of a neighboring flow guide. Corrugated flow guides may also be quasi-parallel, meaning that the orientation planes of two adjacent corrugated flow guides are parallel, but the two neighboring flow guides are not necessarily parallel at each point. In other words, the periodicity of the corrugations in one flow guide may be different from the periodicity of corrugations in an adjacent flow guide. Additionally, the phase of corrugations may be staggered such that peaks and valleys are not adjacent. The corrugations of the flow guides may also be angular rather than wavy. Other flow guides may be a grid-like plurality of intersecting planar sections, a plurality of concentric square cylinders, or a plurality of concentric right circular cylinders. The square cylinders and circular cylinders may be joined by spans to hold the members in fixed relationship, or the square cylinders and circular cylinders may have intersecting walls dividing the spaces between the cylinders. For example, the circular cylinders may have planar radial walls connecting the cylinders.

At 904, a gas is bubbled through the separable liquids mixture through the one or more flow guides. A gas distributor is arranged to inject gas into the vessel near one end of the flow guides. Each gas distributor is fluidly connected to a gas source and includes openings to flow gas from the gas distributor into the mixture in the vessel. The openings are sized to create bubbles smaller than the spacing between the flow guides. The gas may be any useful gas for enhancing separation of separable liquids, and entrained solids. In some cases, air can be used. In other cases, an oxygen-depleted gas can be used if potential flammability needs to be managed.

The gas percolates upward through the liquids mixture between the flow guides, propelling lower density liquids to the top of the liquid column at an enhanced rate. As the lower density liquids rise in prevalence near the top of the liquid column, phases of lower density liquid coalesce into a continuous phase of the lower density liquids. The continuous phase of the lower density liquids is a quiescent zone in which no liquid phase interactions take place. The gas continues to bubble through the quiescent zone, disengaging from the liquids at the top of the liquid column. The flow guides act to prevent central migration and coalescence of gas bubbles flowing upward through the liquid mixture.

The quiescent zone is typically located above the tops of the flow guides. A small layer of mixture consisting mainly of low density liquid phases actively coalescing and eliminating the higher density liquids, and any solids that may be present, downward may persist above the tops of the flow guides. Thus, some of the lower density liquid phases may move over the tops of the flow guides for a short distance while combining with other phases.

At 906, a first liquid phase is removed from an upper part of the vessel, a second liquid phase is removed from a lower part of the vessel, and gas is removed from the upper part of the vessel.

While the foregoing is directed to embodiments of the present invention, other and further embodiments of the present disclosure may be devised without departing from the basic scope thereof, and the scope thereof is determined by the claims that follow.

What is claimed is:

1. A method of separating phases of a separable liquids mixture, the method comprising:
    flowing a separable liquids mixture between vertically oriented flow guides in a vessel, wherein at least one of the flow guides is corrugated;
    bubbling a gas through the separable liquids mixture between the vertically oriented flow guides;
    removing a first separated liquid phase and a second separated liquid phase from the vessel; and
    removing the gas from the vessel.

2. The method of claim 1, further comprising providing a quiescent zone above the vertically oriented flow guides.

3. The method of claim 2, wherein the first separated liquid phase is removed from the quiescent zone.

4. The method of claim 1 further comprising exposing the separable liquids mixture to ultraviolet (UV) light between the plates flow guides.

5. The method of claim 1 further comprising exposing the separable liquids mixture to an electric field between the plates flow guides.

6. The method of claim 1, wherein the separable liquids mixture contains solids, and the solids are removed with the second separated liquid phase.

7. A method of separating liquid phases of a separable liquids mixture, the method comprising:
    flowing a separable liquids mixture between one or more vertically oriented flow guides in a vessel, wherein at least one of the flow guides is curved;
    bubbling a gas through the separable liquids mixture through the one or more vertically oriented flow guides;
    providing a quiescent zone above the vertically oriented flow guides;
    removing a first separated liquid phase from the quiescent zone;
    removing a second separated liquid phase from the vessel; and
    removing the gas from the vessel.

8. The method of claim 7, wherein a flow guide of the one or more flow guides is corrugated.

9. The method of claim 7, wherein the separable liquids mixture includes solids, and the solids are removed with the second separated liquid phase.

10. The method of claim 1, wherein at least one of the flow guides is removable from the vessel.

11. The method of claim 7, wherein the gas is supplied below a bottom of the flow guides.

* * * * *